UNITED STATES PATENT OFFICE.

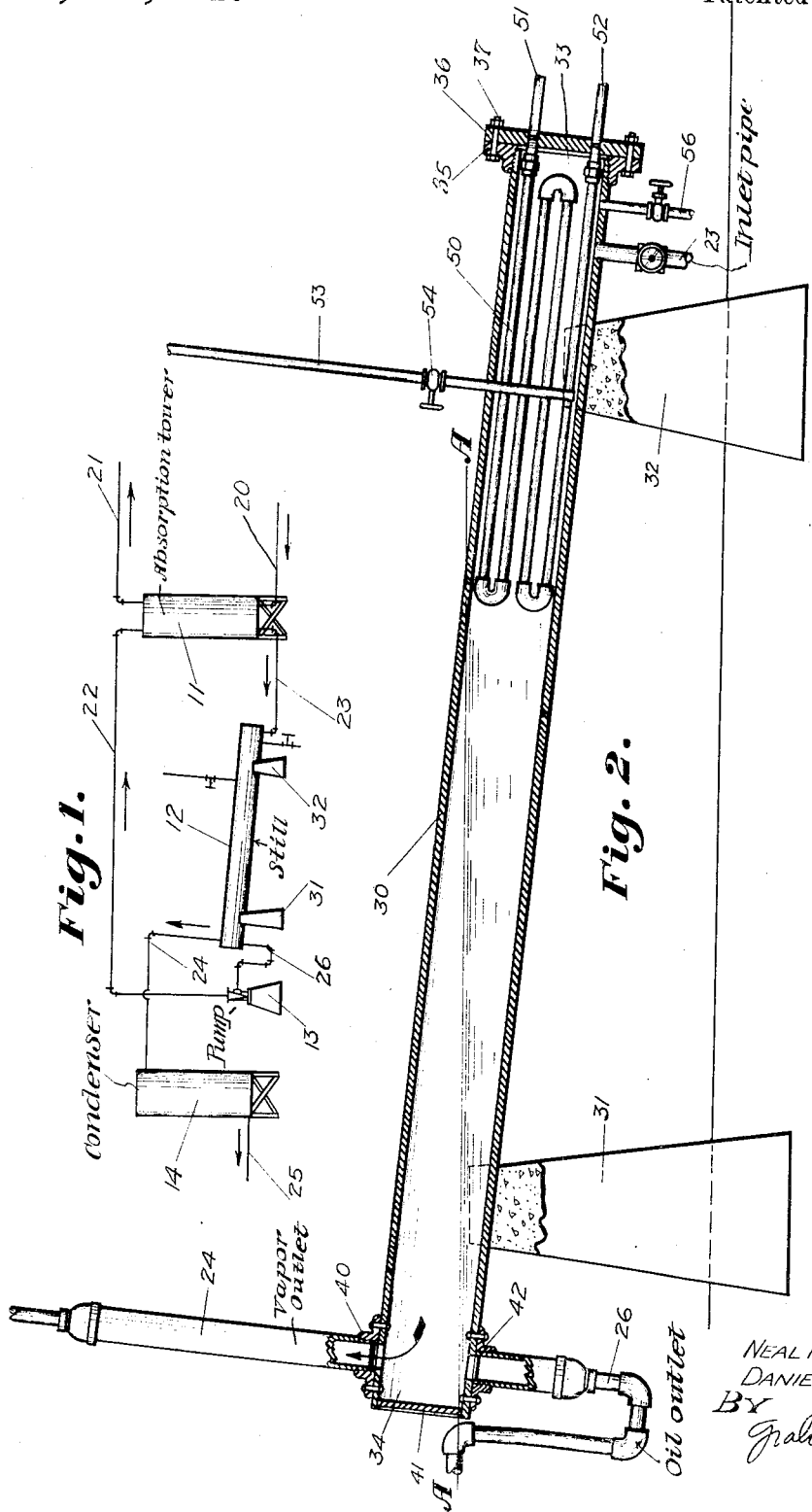

DANIEL L. NEWTON AND NEAL H. ANDERSON, OF FULLERTON, CALIFORNIA.

STILL.

1,376,631.  Specification of Letters Patent.  Patented May 3, 1921.

Application filed June 30, 1919. Serial No. 308,023.

*To all whom it may concern:*

Be it known that we, DANIEL L. NEWTON and NEAL H. ANDERSON, both citizens of the United States, residing at Fullerton, in the county of Orange, State of California, have invented a new and useful Improvement in Stills, of which the following is a specification.

Our invention relates to the apparatus used for the distillation of oil, and more particularly to a form of still which is specially applicable to the absorption process used in California and elsewhere for recovering gasolene from natural gas. In this process the natural gas is passed through an absorption tower in which it is subjected to contact with an absorbing medium, usually mineral seal oil or the like, this mineral seal oil absorbing the gasolene from the gas. The mineral seal oil with the gasolene therein is then run through a still in which the gasolene is distilled off from the mineral seal oil, which is then returned to the absorption tower to collect more gas.

The principal object of our invention is to provide a still which is peculiarly suited for use in such a process.

Referring to the drawings, which are for illustrative purposes only,

Figure 1 is a diagram showing the method of connecting the still to the absorption tower, and Fig. 2 is a vertical cross section through the still showing the method of construction.

In the diagram Fig. 1 an absorption tower 11, a still 12, a pump 13 and a condenser 14 are shown. The wet natural gas is supplied to the bottom of the tower 11, through a pipe 20, the dry natural gas being taken off through a pipe 21. The mineral seal oil is supplied to the top of the tower through a pipe 22, the mixture of gasolene and mineral seal oil being delivered to the still 12 through a pipe 23. The gasolene in vapor form is delivered by the still 12 to a pipe 24, being delivered by the pipe 24 to the condenser 14, the condensed gas being taken off through a pipe 25. The mineral seal oil from which the gasolene has been evaporated is delivered through a pipe 26 to the pump 13, which forces it through the pipe 22 into the absorption tower 11.

The above method of connection of a still is old in the art, our invention comprising the specific still shown.

In the form of our invention shown the still consists of a cylindrical shell 30, which is mounted on supports 31 and 32 in such a manner that one end is depressed as shown at 33, the other end being elevated as shown at 34. The end 33 is provided with a flange 35 and tight cover 36 secured in place by bolts 37. The pipe 23 connects into the shell 30 near the depressed end 33. The pipe 24 is connected into the shell 30 by means of a flange 40 at the extreme top thereof near the raised end 34, which is closed by a plate 41, which is preferably welded in place. The pipe 26 is connected into a flange 42 secured in the bottom of the shell 30 at the elevated end 34.

A series of heating pipes 50 are provided near the depressed end 33, steam being supplied through a pipe 51 and condensed water being withdrawn through a pipe 52. A live steam pipe 53 connects into the top of the shell 30, extending to a point near the bottom thereof, being supplied by a control valve 54. A water drain pipe 56 is provided in the bottom of the shell 30 near the depressed end 33.

The method of operation of the still is as follows:

The mixture of gasolene and mineral seal oil being delivered to the shell 30 through the pipe 23, is mixed with the body of mineral seal oil in the shell by the natural circulation set up by the steam coils 50 and by the agitating action of live steam admitted through the pipe 53. The still is so inclined that the oil level follows the line A—A, the pipes 50 being completely submerged at all times and the pipe 26 being so placed that it withdraws the mineral seal oil from near the bottom of the raised end 34. The heat being applied to the oil at the lower end of the still 30, a large evaporative surface is provided between the coils 50 and the outlet 26 so that the gasolene vapor can readily escape into the open space inside the still 30 above the line A—A, this vapor being taken off through the pipe 24. Any water which accumulates in the still can be readily withdrawn through the pipe 56.

A great difficulty in the operation of absorption plants is the tendency for the mineral seal oil or other absorbing medium to emulsify, due to the condensation of the water from the gas. By providing a still of the peculiar type shown we reduce this emulsion to a minimum and allow any water which settles on the inclined bottom of the still 30 to find its way along the bottom of that pipe to the outlet pipe 56.

By arranging the take-off or outlet for the mineral seal oil, that is, the pipe 26 in the lower portion of the elevated end of the still it will be noted that the oil removed through this pipe is from the top of the body of oil in the still, which arrangement insures that the mineral seal oil withdrawn from the still is entirely free from gasolene vapors and water.

It is further to be noted that by arranging the heating coil in the lower or depressed end of the still that the heat is supplied to that portion of the still containing the deepest or greatest body of liquid and that the agitation of the liquid in the still takes place almost entirely at the lower end of the still thereby permitting the body of oil, as the same approaches the outlet end of the still and becomes shallower, to become quiet and present a calm surface from which the gasolene and water vapor is readily released.

We claim as our invention:

1. A still comprising a cylindrical shell having its axis inclined; a dry oil outlet pipe near the raised end thereof, so arranged as to maintain a free vapor space in said end above the level of the oil therein; steam coils completely submerged in the oil at the depressed end of said still; a vapor outlet pipe for taking off vapor from said vapor space; and a saturated oil inlet delivering oil to the interior of said shell.

2. A still comprising a cylindrical shell having its axis inclined; a dry oil outlet pipe near the raised end thereof, so arranged as to maintain a free vapor space in said end above the level of the oil therein; steam coils completely submerged in the oil at the depressed end of said still; a vapor outlet pipe for taking off vapor from said vapor space; means for withdrawing water from the lowest portion of said still; and a saturated oil inlet delivering oil to the interior of said shell.

3. A still comprising a cylindrical shell having its axis inclined; a dry oil outlet pipe near the raised end thereof, so arranged as to maintain a free vapor space in said end above the level of the oil therein; steam coils completely submerged in the oil at the depressed end of said still; means for supplying steam to the oil in said still; a vapor outlet pipe for taking off vapor from said vapor space; and a saturated oil inlet delivering oil to the interior of said shell.

4. A still comprising a cylindrical shell having its axis inclined; a dry oil outlet pipe near the raised end thereof, so arranged as to maintain a free vapor space in said end above the level of the oil therein; steam coils completely submerged in the oil at the depressed end of said still; means for supplying steam to the oil in said still; a vapor outlet pipe for taking off vapor from said vapor space; means for withdrawing water from the lowest portion of said still; and a saturated oil inlet delivering oil to the interior of said shell.

In testimony whereof, we have hereunto set our hands at Fullerton, California, this 19th day of June, 1919.

DANIEL L. NEWTON.
NEAL H. ANDERSON.